United States Patent
Eick et al.

(10) Patent No.: US 7,401,461 B2
(45) Date of Patent: Jul. 22, 2008

(54) REDUCED-WEIGHT FUEL SYSTEM FOR GAS TURBINE ENGINE, GAS TURBINE ENGINE HAVING A REDUCED-WEIGHT FUEL SYSTEM, AND METHOD OF PROVIDING FUEL TO A GAS TURBINE ENGINE USING A REDUCED-WEIGHT FUEL SYSTEM

(75) Inventors: Christopher D. Eick, Phoenix, AZ (US); Timothy D. Mahoney, Chandler, AZ (US); David D. Jones, Maumee, OH (US); William Lorenz, Dowagiac, MI (US)

(73) Assignee: Honeywell International Inc., Morristown, NJ (US)

( * ) Notice: Subject to any disclaimer, the term of this patent is extended or adjusted under 35 U.S.C. 154(b) by 382 days.

(21) Appl. No.: 11/139,953

(22) Filed: May 27, 2005

(65) Prior Publication Data

US 2006/0266047 A1 Nov. 30, 2006

(51) Int. Cl.
*F02C 7/236* (2006.01)
(52) U.S. Cl. .................. 60/39.091; 60/734; 60/786
(58) Field of Classification Search .............. 60/39.091, 60/734, 778, 779, 786
See application file for complete search history.

(56) References Cited

U.S. PATENT DOCUMENTS

| | | | |
|---|---|---|---|
| 2,607,297 A | 8/1952 | Walker et al. | |
| 2,667,742 A * | 2/1954 | Kuzmitz | 60/786 |
| 2,916,875 A | 12/1959 | Morlet et al. | |
| 3,147,712 A | 9/1964 | Gaubatz | |
| 3,589,836 A | 6/1971 | Danker et al. | |
| 3,696,612 A | 10/1972 | Berman | |
| 4,245,964 A | 1/1981 | Rannenberg | |
| 4,607,486 A | 8/1986 | Cole | |
| 4,864,815 A | 9/1989 | Cygnor | |
| 4,915,593 A | 4/1990 | Cygnor | |
| 5,116,362 A | 5/1992 | Arline et al. | |
| 5,118,258 A | 6/1992 | Martin | |
| 2002/0050140 A1 | 5/2002 | Blot-Carretero et al. | |
| 2003/0056521 A1 | 3/2003 | Dewis | |

FOREIGN PATENT DOCUMENTS

EP 0 657 651 A1 6/1995
FR 1 541 486 A 10/1968

\* cited by examiner

*Primary Examiner*—L. J. Casaregola
(74) *Attorney, Agent, or Firm*—Ingrassia, Fisher & Lorenz, P.C.

(57) ABSTRACT

A fuel system (10) for a gas turbine engine (18) having a shaft (30) and requiring fuel to be supplied at a first rate for engine start up, the fuel system (10) including: a main fuel pump (14) for providing fuel to the gas turbine engine (18), the main fuel pump (14) having an output varying with shaft speed, the output being at a windmilling rate when the engine (18) is windmilling, the windmilling rate being less than the first rate; and an auxiliary fuel pump (40) for providing fuel to the gas turbine engine (18) and having an auxiliary output rate greater than or equal to the difference between the first rate and the windmilling rate. A method of operating such a fuel system (10) is also disclosed.

12 Claims, 2 Drawing Sheets

REDUCED-WEIGHT FUEL SYSTEM FOR GAS TURBINE ENGINE, GAS TURBINE ENGINE HAVING A REDUCED-WEIGHT FUEL SYSTEM, AND METHOD OF PROVIDING FUEL TO A GAS TURBINE ENGINE USING A REDUCED-WEIGHT FUEL SYSTEM

FIELD OF THE INVENTION

The present invention is directed to an improved fuel system for a gas turbine engine, a gas turbine engine including such an improved fuel system and a method of providing fuel to a gas turbine engine using an improved fuel system, and, more specifically, toward a reduced-weight fuel system for a gas turbine engine including an auxiliary fuel pump, a gas turbine engine including a reduced-weight fuel system having an auxiliary fuel pump, and a method of supplying fuel to a gas turbine engine using a reduced-weight fuel system including an auxiliary fuel pump.

BACKGROUND OF THE INVENTION

Gas turbine engines, such as those found on jet aircraft, comprise a housing within which fuel and air are combined and burned. Such engines generally include vanes for drawing air into the housing and a compressor that compresses the air and sends it to a gas generator. In the gas generator, a precisely metered supply of fuel is mixed with the compressed air and burned. Expanding exhaust gasses turn a turbine which turns a shaft that provides power to the compressor, a fuel pump, and other elements associated with the engine. The exhaust gasses then pass through the remainder of the housing and exit the housing to provide thrust.

A starter, which is not part of the gas turbine engine or aircraft, is generally used to start a gas turbine engine. The starter causes the engine shaft to rotate at about 10 to 25 percent of its rated speed. This causes the compressor to compress air and the fuel pump to pump fuel to the gas generator. Once the fuel in the gas generator is successfully ignited, expanding exhaust gasses turn the turbine and the shaft and provide power for the compressor and fuel pump so that the starter is no longer needed.

Engines are generally designed to start reliably when their shaft is rotating at a certain percentage of rated speed. This does not mean that the engine will never start at a lower speed, but that starts at such lower speeds are not as likely to occur as when the engine is turning at an intended starting speed. It is generally desirable to turn an engine shaft at about 10 percent of its rated speed during engine start-up; at lower speeds starting may be difficult because, for example, the fuel pump may provide fuel at too low a rate for a reliable start.

Sometimes it becomes necessary to restart an engine while an aircraft is in flight. Air rushing through the engine housing of a non-functioning engine causes the blades on the compressor shaft to rotate and run the fuel pump. This rotation is sometimes referred to as "windmilling." An engine restart while its compressor is windmilling may be referred to as a "windmill start." The windmilling blades turn the engine shaft, but generally not at the 10 percent of rated engine speed considered desirable for a reliable engine start. In modern turbofan engines, for example, the windmilling blades may only turn the engine shaft at 5 percent of the rated engine speed. Other variables, such as airspeed when the restart becomes necessary, may further reduce the ability of the engine to be reliably windmill restarted.

The fuel pump used on a gas turbine engine must be large enough to provide fuel over a wide range of engine operating speeds. However, a fuel pump capable of supplying an engine with fuel under normal operating conditions may not supply adequate fuel for a windmill start. Therefore, it is known to provide gas turbine engines with fuel pumps that are, for example, 50 to 100 percent larger than necessary for normal engine operation to ensure that the fuel pump can provide an adequate fuel supply at low windmilling shaft speeds.

Using a fuel pump larger than is required for normal engine operation increases the weight and cost of a gas turbine engine. Furthermore, such a large fuel pump generates more heat than would be produced by a smaller fuel pump. This heat must be absorbed or dissipated by various heat sinks, such as the fuel supply, in the gas turbine engine, and this limits the amount of heat that these sinks can absorb from other sources. It would therefore be desirable to provide a gas turbine engine fuel system that would allow for reliable windmill engine restarts using a smaller fuel pump than has heretofore been possible.

SUMMARY OF THE INVENTION

These problems and others are addressed by the present invention which comprises, in a first aspect, a fuel system for a gas turbine engine that has a shaft and that requires fuel to be supplied at a first rate for engine start up. The fuel system has a main fuel pump for providing fuel to the gas turbine engine that has an output varying with shaft speed. When the engine shaft is windmilling, the fuel pump output rate is referred to as the windmilling rate, and the windmilling rate is less than the first rate. The fuel system also includes an auxiliary fuel pump for providing fuel to the gas turbine engine that has an auxiliary output rate which is greater than or equal to the difference between the first rate and the windmilling rate.

Another aspect of the invention comprises a gas turbine engine that has a rotatable shaft with a plurality of vanes connected thereto. The engine also includes a combustion chamber and a main fuel pump that provides fuel to the combustion chamber at a rate related to the rotation speed of the rotatable shaft. The gas turbine engine requires that fuel be supplied to the combustion chamber at a first rate for combustion to start; however, when the gas turbine engine is windmilling, the main fuel pump supplies fuel to the combustion chamber at a second rate that is less than the first rate. The fuel system includes an auxiliary fuel pump for providing fuel to the gas turbine engine at a third rate that is greater than or equal to the difference between the first rate and the second rate.

An additional aspect of the invention comprises a method of providing fuel to a gas turbine engine that includes a shaft for driving a main fuel pump, wherein the gas turbine engine requires fuel to be supplied at a first rate for the engine to start up, which method involves providing a main fuel pump having an output at a second rate when the shaft is windmilling, the second rate being less than the first rate, providing an auxiliary fuel pump having an output greater than or equal to a difference between the first rate and the second rate, and providing fuel to the gas turbine engine from the auxiliary engine during windmill starts.

BRIEF DESCRIPTION OF THE DRAWINGS

These aspects of the invention and others will be better understood after a reading of the following detailed description together with the following drawings wherein.

DETAILED DESCRIPTION

Figure 1:
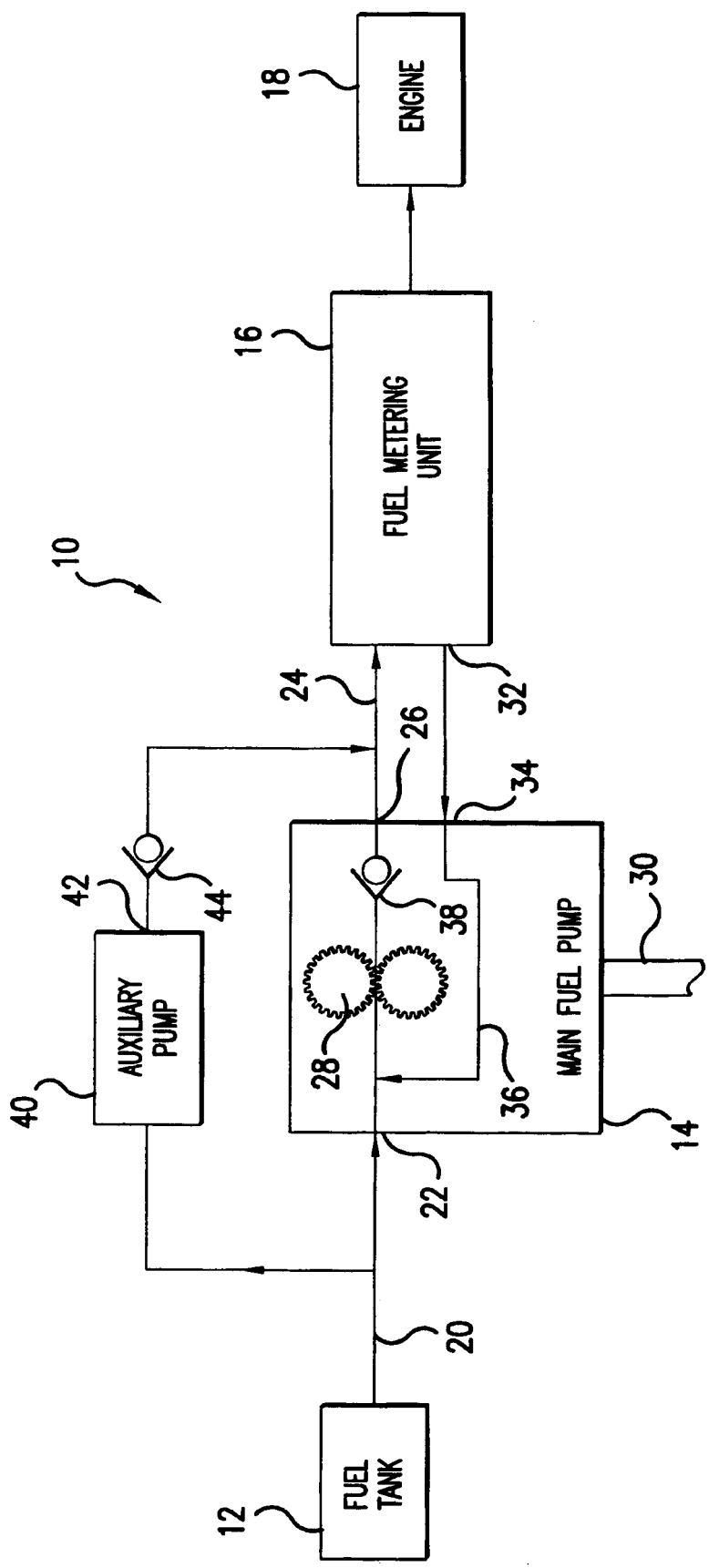
FIG. 1 schematically illustrates a gas turbine engine and a fuel system according to an embodiment of the present invention.

Referring now to the drawings, wherein the showings are for purposes of illustrating preferred embodiments of the invention only and not for the purpose of limiting same, FIG. 1 schematically illustrates an aircraft fuel system 10 comprising a fuel tank 12, a main fuel pump 14, and a fuel metering unit 16 providing fuel to an engine 18. A main fuel pump input fuel line 20 connects the fuel tank 12 to a first input 22 of the main fuel pump 14, and a main fuel pump output fuel line 24 leads from main fuel pump output 26 to fluid metering unit 16. Main fuel pump 14 comprises a gear pump and includes gears 28 driven by a shaft 30 powered by the rotation of engine 18 in a well-known manner.

Because gears 28 pump fuel at a rate based on engine speed, main fuel pump 14 often provides fuel at a rate greater than the rate required by fuel metering unit 16 or engine 18. Therefore, fuel metering unit 16 includes a recirculation output 32 for returning unneeded fuel to a recirculation input 34 of main fuel pump 14. A recirculation pathway 36 in main fuel pump 14 returns fuel to a point upstream of gears 28 where it is again pumped toward fuel metering unit 16. A first check valve 38 is provided upstream of gears 28 to substantially prevent reverse flows of fuel through main fuel pump output fuel line 24.

Fuel system 10 further includes an auxiliary pump 40 connected to main fuel pump input line 20 at a point upstream from main fuel pump 20 and having an output 42 that flows through a second check valve 44 and enters main fuel pump output fuel line 24 at a point downstream of the main fuel pump output 26. Auxiliary pump 40 pumps at a rate that is controllable independently of the rate of rotation of shaft 30. In a presently preferred embodiment, auxiliary pump 40 is an electric pump driven by the electrical system of an aircraft (not shown) in which fuel system 10 is located. Auxiliary pump 40 may be, for example, a fixed displacement pump.

Engine 18 requires that fuel be provided at a first, or startup, rate in order to achieve a reliable start. If fuel is provided at a lower rate than this startup rate, the engine may sometimes start, but not as reliably. As used herein, a rate "required" for startup is a rate necessary for reliable startup; it is possible that an engine will occasionally restart when fuel is provided at less than the "required" rate. Main fuel pump 14 is sized so that it can provide a fuel at this start-up rate when a starter turns engine 18 at about 10 percent of its rated speed. Main fuel pump 14 is also sized so that it can provide a required supply of fuel to engine 18 under all normal operating conditions, and might be expected to produce an output of about, for example, 8000 lb/hour.

Auxiliary pump 40 is relatively small, and in this embodiment has an output of less than about 200 lb/hour. Auxiliary pump 40 will generally produce an output of less than about 2.5 percent of the rated output of main fuel pump 14 and may produce an output pressure less than about one fifth of the maximum output pressure of main fuel pump 14.

During normal engine operation, auxiliary fuel pump 40 is generally not used. Instead, main fuel pump 14 supplies engine 18 with all fuel necessary for normal operation. Second check valve 44 substantially prevents fuel from flowing from main fuel pump output fuel line 24 to auxiliary pump 40. However, if engine 18 experiences a blow-out during flight and combustion ceases, engine 18 must be restarted without the use of a separate starter. Under these conditions, air flowing through engine 18 will turn shaft 30 and the compressor blades (not shown) on engine 18 and thus operate main fuel pump 14. The windmilling shaft 30, however, will generally not turn shaft 30 at the 10 percent of rated speed required for a reliable restart. Shaft 30 may only turn at 5 percent rated speed, for example, under such conditions, and the windmilling output rate of main fuel pump 14 will therefore be inadequate to reliably restart engine 18. Thus, when a windmill restart is necessary, auxiliary pump 40 is actuated to operate either independently or in parallel with the windmilling output of main fuel pump 14.

Thus, auxiliary pump 40 is sized to provide an output rate equal to at least the difference between the output rate of main fuel pump 14 required for normal start up and the output rate of main fuel pump 14 under windmilling conditions. Thus, the auxiliary pump 40 and main fuel pump 14 in parallel will provide adequate fuel for an engine restart. Alternately, auxiliary pump 40 may be sized to provide an output about equal to or slightly greater than the total fuel output required for a restart of engine 18. Thus, even if an engine blow out occurs at a time when shaft 30 is windmilling at a very low rate, auxiliary pump 40 will alone be able to provide fuel at a rate necessary for a reliable restart.

The use of auxiliary pump 40 allows for a significant reduction in the size of main fuel pump 14 in that main fuel pump need only be large enough to supply fuel to engine 18 under normal operating conditions and does not have to supply fuel to engine 18 on its own during a windmill restart. The combined weight and heat output of such a smaller main fuel pump 14 and auxiliary pump 14 is less than the weight of a main fuel pump that heretofore would have been required. The smaller main fuel pump 14 also generates less waste heat than would have been produced by a larger main fuel pump and therefore leaves a greater portion of the heat-absorbing capacity of the fuel system available for other types of cooling.

Figure 2:
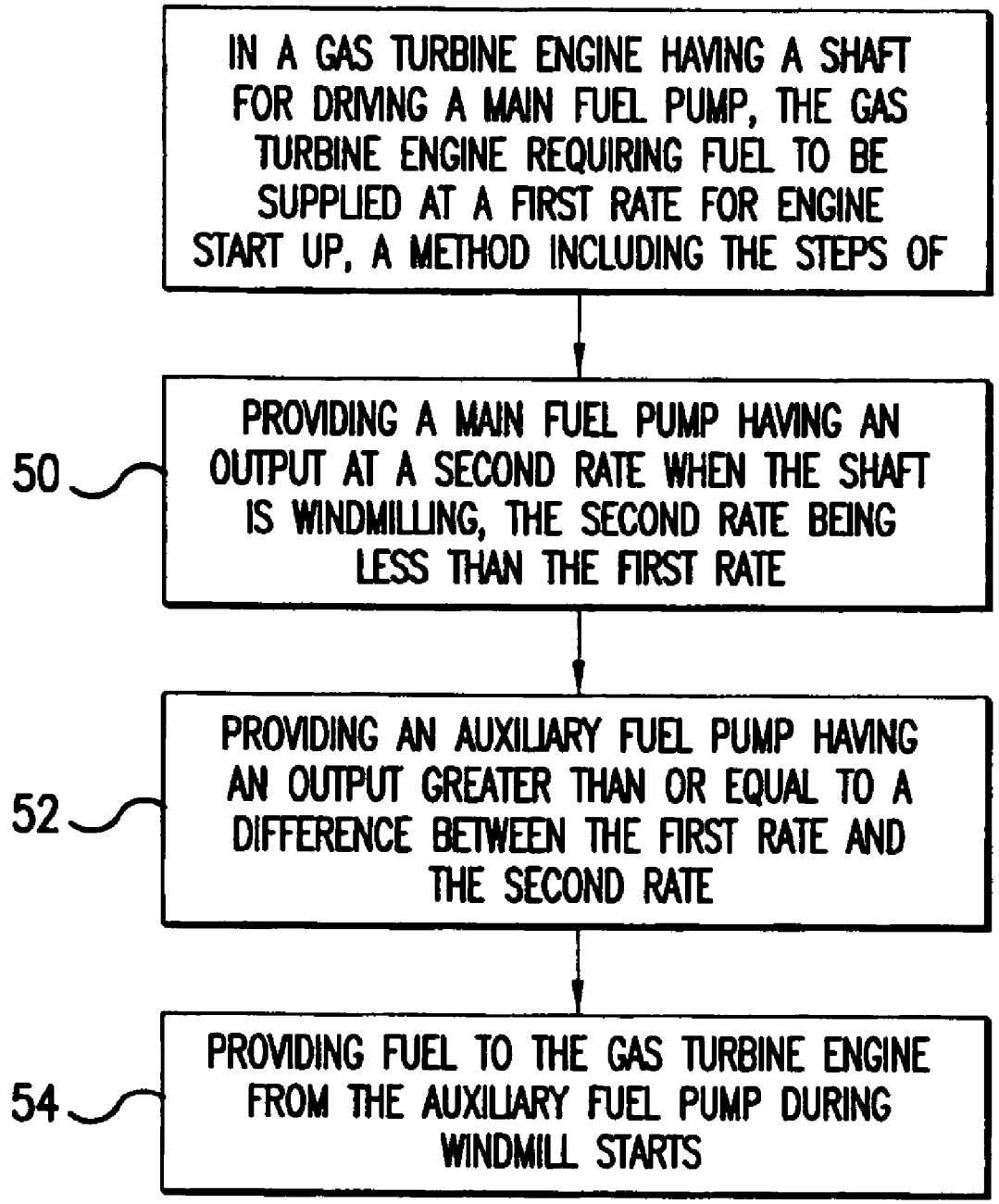
FIG. 2 is a flow chart outlining a method of operating the fuel system of claim 1.

FIG. 2 illustrates a method of operating a gas turbine engine having a shaft for driving a main fuel pump which gas turbine engine requires fuel to be supplied at a first rate for engine start up. The method includes a step 50 of providing a main fuel pump having an output at a second rate less than the first rate when the shaft is windmilling, a step 52 of providing an auxiliary fuel pump having an output greater than or equal to a difference between the first rate and the second rate, and a step 54 of providing fuel to the gas turbine engine from the auxiliary fuel pump during windmill starts.

The present invention has been described herein in terms of a particular embodiment. However, obvious modifications and additions to this embodiment will become apparent to those skilled in the relevant arts upon a reading of the foregoing disclosure. It is intended that all such obvious modifications comprise a part of this invention to the extent they fall within the scope of the several claims appended hereto.

We claim:

1. A fuel system for a gas turbine engine having a shaft and requiring fuel to be supplied at a first rate for engine start up, said fuel system comprising:
   a main fuel pump for providing fuel to the gas turbine engine, said main fuel pump having an output varying with shaft speed, said output comprising a windmilling rate when the engine is windmilling, the windmilling rate being less than said first rate; and
   an electric auxiliary fuel pump for providing fuel to the gas turbine engine having an auxiliary output rate greater than or equal to a difference between said first rate and said windmilling rate, wherein, the main and auxiliary fuel pumps are arranged to cooperate to supply sufficient fuel for starting during windmill operation.

2. The fuel system of claim 1 wherein said auxiliary output rate is greater than or equal to said first rate.

3. The fuel system of claim 1 wherein said electric auxiliary fuel pump comprises a fixed displacement pump.

4. The fuel system of claim 1 wherein said electric auxiliary fuel pump has an output of less than about 200 lb/hour.

5. The fuel system of claim 1 wherein said main fuel pump has a maximum output rate and wherein said auxiliary rate is less than about 2.5 percent of said maximum output rate.

6. The fuel system of claim 5 wherein said main fuel pump has a maximum output pressure and said electric auxiliary fuel pump has a maximum output pressure less than about one fifth of said main fuel pump maximum output pressure.

7. The fuel system of claim 1 wherein said windmilling rate is less than about half of said first rate.

8. A gas turbine engine comprising:
   a rotatable shaft;
   a plurality of vanes connected to the rotatable shaft;
   a combustion chamber;
   a main fuel pump providing fuel to the combustion chamber at a rate related to a rotation speed of the rotatable shaft;
   said gas turbine engine requiring fuel to be supplied to the combustion chamber at a first rate for combustion to staff;
   said main fuel pump supplying fuel to said combustion chamber at a second rate less than said first rate when said gas turbine engine is windmilling; and
   an electric auxiliary fuel pump for providing fuel to the gas turbine engine at a third rate, said third rate being greater than or equal to the difference between said first rate and said second rate.

9. The gas turbine engine of claim 8 wherein said third rate is greater than or equal to said first rate, wherein, the main and auxiliary fuel pumps are arranged to cooperate to supply sufficient fuel for starting during windmill operation.

10. The fuel system of claim 8 wherein said electric auxiliary fuel pump comprises a fixed displacement pump.

11. The fuel system of claim 8 wherein said electric auxiliary fuel pump has an output of less than about 200 lb/hour.

12. The fuel system of claim 8 wherein said main fuel pump has a maximum output rate and wherein said auxiliary rate is less than about 2.5 percent of said maximum output rate.

\* \* \* \* \*

UNITED STATES PATENT AND TRADEMARK OFFICE
CERTIFICATE OF CORRECTION

PATENT NO. : 7,401,461 B2
APPLICATION NO. : 11/139953
DATED : July 22, 2008
INVENTOR(S) : Christopher D. Eick et al.

It is certified that error appears in the above-identified patent and that said Letters Patent is hereby corrected as shown below:

Column 6, line 3, "staff" should be changed to --start--.

Signed and Sealed this

Twenty-third Day of September, 2008

JON W. DUDAS
*Director of the United States Patent and Trademark Office*